United States Patent
Marque-Pucheu et al.

(10) Patent No.: US 7,224,683 B1
(45) Date of Patent: May 29, 2007

(54) RADIO COMMUNICATION METHOD BETWEEN A BASE STATION AND MOBILE TERMINALS, BASE STATIONS AND MOBILE TERMINALS FOR IMPLEMENTING SAME

(75) Inventors: Gérard Marque-Pucheu, Verneuil-sur-Seine (FR); Michel Lambourg, Chaville (FR)

(73) Assignee: Eads Secure Networks, Montigny le Bretonneux (FR)

( * ) Notice: Subject to any disclaimer, the term of this patent is extended or adjusted under 35 U.S.C. 154(b) by 1014 days.

(21) Appl. No.: 10/048,520

(22) PCT Filed: Aug. 1, 2000

(86) PCT No.: PCT/FR00/02210

§ 371 (c)(1),
(2), (4) Date: Apr. 24, 2002

(87) PCT Pub. No.: WO01/11803

PCT Pub. Date: Feb. 15, 2001

(30) Foreign Application Priority Data

Aug. 6, 1999 (FR) .................................. 99 10261

(51) Int. Cl.
*H04B 7/212* (2006.01)
(52) U.S. Cl. ...................................... 370/348; 370/350
(58) Field of Classification Search ...................... None
See application file for complete search history.

(56) References Cited

U.S. PATENT DOCUMENTS

| | | | |
|---|---|---|---|
| 4,740,792 A * | 4/1988 | Sagey et al. ................. | 342/457 |
| 5,231,635 A | 7/1993 | Travers et al. | |
| 5,404,355 A * | 4/1995 | Raith .......................... | 370/311 |
| 6,252,868 B1 * | 6/2001 | Diachina et al. ............ | 370/347 |
| 6,438,136 B1 * | 8/2002 | Bahl ........................... | 370/458 |
| 6,519,469 B1 * | 2/2003 | Rydnell et al. .............. | 455/466 |

FOREIGN PATENT DOCUMENTS

| EP | 0 480 505 | 4/1992 |
|---|---|---|
| EP | 0 884 864 | 12/1998 |

OTHER PUBLICATIONS

Int'l. Search Report, PCT/FR00/02210, dated Dec. 14, 2000.

* cited by examiner

*Primary Examiner*—Hassan Kizou
*Assistant Examiner*—Anthony Sol
(74) *Attorney, Agent, or Firm*—McCracken & Frank LLP

(57) ABSTRACT

A carrier frequency is apportioned to timeslots, and logical channels are formed between the base station and mobile terminals to support services in connection with these mobile terminals. Each of the logical channels consists of recurring timeslots allocated to at least one mobile terminal on the carrier frequency. To implement one of the services which involves transmission of periodically updated information, a recurrence frequency is selected from a plurality of possible values, as being substantially the inverse of the updating period for said information, and a logical channel is formed between the base station and a mobile terminal by allocating timeslots having the selected recurrence frequency on the carrier frequency.

15 Claims, 6 Drawing Sheets

RADIO COMMUNICATION METHOD BETWEEN A BASE STATION AND MOBILE TERMINALS, BASE STATIONS AND MOBILE TERMINALS FOR IMPLEMENTING SAME

The present invention relates to the field of radio communications between base stations and mobile terminals, using time-division multiplexing of logical channels on a carrier frequency.

Radio-communications systems with mobiles use two main methods for transferring the signaling between the mobile terminal and the radio infrastructure.

In the first method, the transmissions of radio-infrastructure signaling to the mobile terminal are not deterministic and the mobile terminal has to keep listening out for the control channel, demodulate all the messages transmitted by the infrastructure to the various mobile terminals and choose those which concern it by virtue of an addressing mechanism.

Another method consists in allocating, from the start of the transaction, a signaling logical channel which is entirely reserved for said transaction between the radio infrastructure and the mobile terminal. This is the method used, in particular, by the GSM radiotelephony system. The logical channel defined as a sequence of regular uplink and downlink timeslots in which the information from the infrastructure is transmitted to a particular mobile and the information from said mobile is transmitted to the radio infrastructure.

In the radiotelephony systems using this mechanism, all the logical channels dedicated to the transactions with the mobile terminals have the same throughput, i.e. the same frequency of occurrence of the timeslots belonging to the dedicated signaling channel.

This situation is well suited to the case of the public radiotelephony systems, the principal function of which is to set up calls between the mobile terminals and the infrastructure of the switched public network. The periodicity of the timeslots is then chosen so as to allow communication-establishment times which are as short as possible while offering a sufficient delay between the downlink transmission from the radio infrastructure to the mobile and the uplink transmission from the mobile terminal to the radio infrastructure, so that a response from the application is available and therefore that the timeslot is used in the most effective way possible.

This configuration of the dedicated signaling channel is much less suitable for the case of professional radio communications networks in which a greater variety of services is offered and for which a single choice of periodicity of the timeslots in the dedicated signaling channels may lead to inefficient use of the control channel.

An object of the present invention is to remedy this drawback so as to offer a quality of service which is always adapted to the telecommunications service implemented.

According to the invention, a method of radio communication is proposed between a base station and mobile terminals, wherein at least one carrier frequency is apportioned to timeslots, and logical channels are formed between the base station and mobile terminals to support services in connection with said mobile terminals, each of said logical channels consisting of recurring timeslots allocated to at least one mobile terminal on said carrier frequency. To implement one of said services which involves transmission of periodically updated information, a recurrence frequency is selected from a plurality of possible values, as being substantially the inverse of the updating period for said information, and a logical channel is formed between the base station and a mobile terminal by allocating timeslots having the selected recurrence frequency on the carrier frequency.

The method makes it possible to respond to varied transmission needs between mobile terminals and a radio infrastructure in the case of professional radio communications networks, in an effective way in terms of use of the bandwidth and of frequency of updating of the information. For each service, it is possible to choose the timeslot recurrence frequency, which determines the rate of updating of the information and/or the time of response to the service.

It is thus possible to manage transaction needs between the mobile terminals and the radio infrastructure, such as the establishing of a communication with the switched telephone network, for example, or automatic location of a mobile terminal, with variable periodicities depending on the operational conditions in which the vehicle containing the mobile terminal or the pedestrian carrying this terminal is placed. The method may further be used to offer an efficient messaging service to simplified terminals (of "pager" type) carried under the usual conditions for this type of terminals, without the other mobile terminals being disturbed by the provision of this messaging service.

In a preferred embodiment of the method, the recurrence frequency of the timeslots allocated to a mobile terminal when establishing one of the logical channels is selected from a set of values of the form $1/T_k$ ($k=1, 2, 3, \ldots$) such that $T_{k+1}/T_k$ is an integer for any k, $T_1$ being a basic timeslot periodicity on the carrier frequency.

The invention also relates to a radio communications base station, comprising means for multiplexing logical channels on at least one carrier frequency to support services in connection with mobile terminals, each of said logical channels consisting of recurring timeslots allocated to at least one mobile terminal on said carrier frequency, and channel-establishing means, arranged to establish at least one of said logical channels supporting a service which involves transmission of periodically updated information, by allocating timeslots on the carrier frequency, having a recurrence frequency selected, from a plurality of possible values, as being substantially the inverse of the updating period for said information.

According to another aspect of the invention, a mobile radio communications terminal is proposed, comprising means for communicating on at least one carrier frequency apportioned to timeslots, along at least one logical channel formed with a base station of a radio infrastructure to support a service in connection with the mobile terminal, said logical channel consisting of recurring timeslots allocated to the mobile terminal on said carrier frequency. These means are arranged to communicate along said logical channel, supporting a service which involves transmission of periodically updated information, in timeslots on the carrier frequency having a recurrence frequency selected, from a plurality of possible values, as being substantially the inverse of the updating period for said information.

Other features and advantages of the present invention will become apparent from the description below of non-limiting embodiment examples, by reference to the attached drawings, in which.

Figure 1:
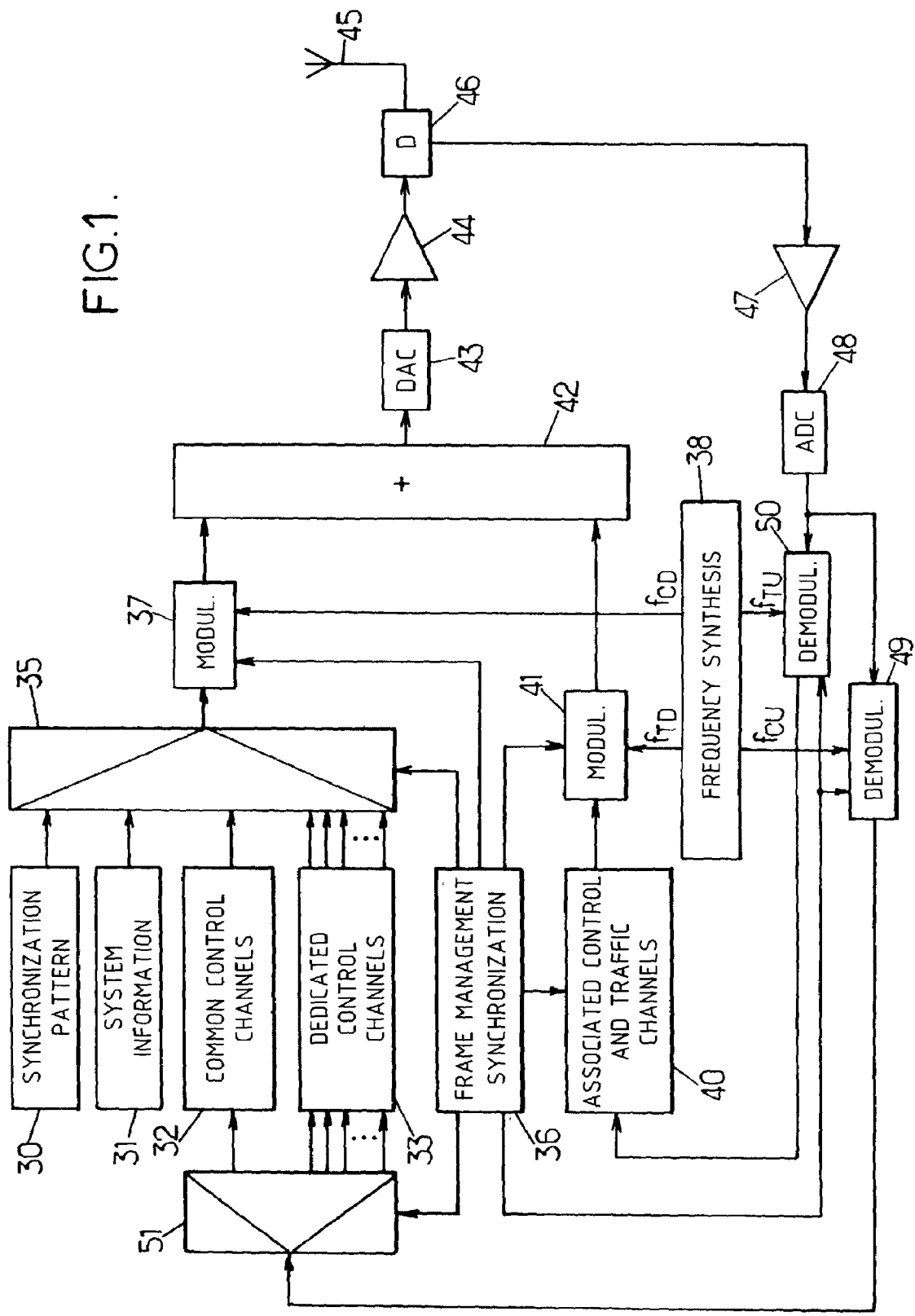
FIG. 1 is a block diagram of an example base station according to the invention.
Figure 2:
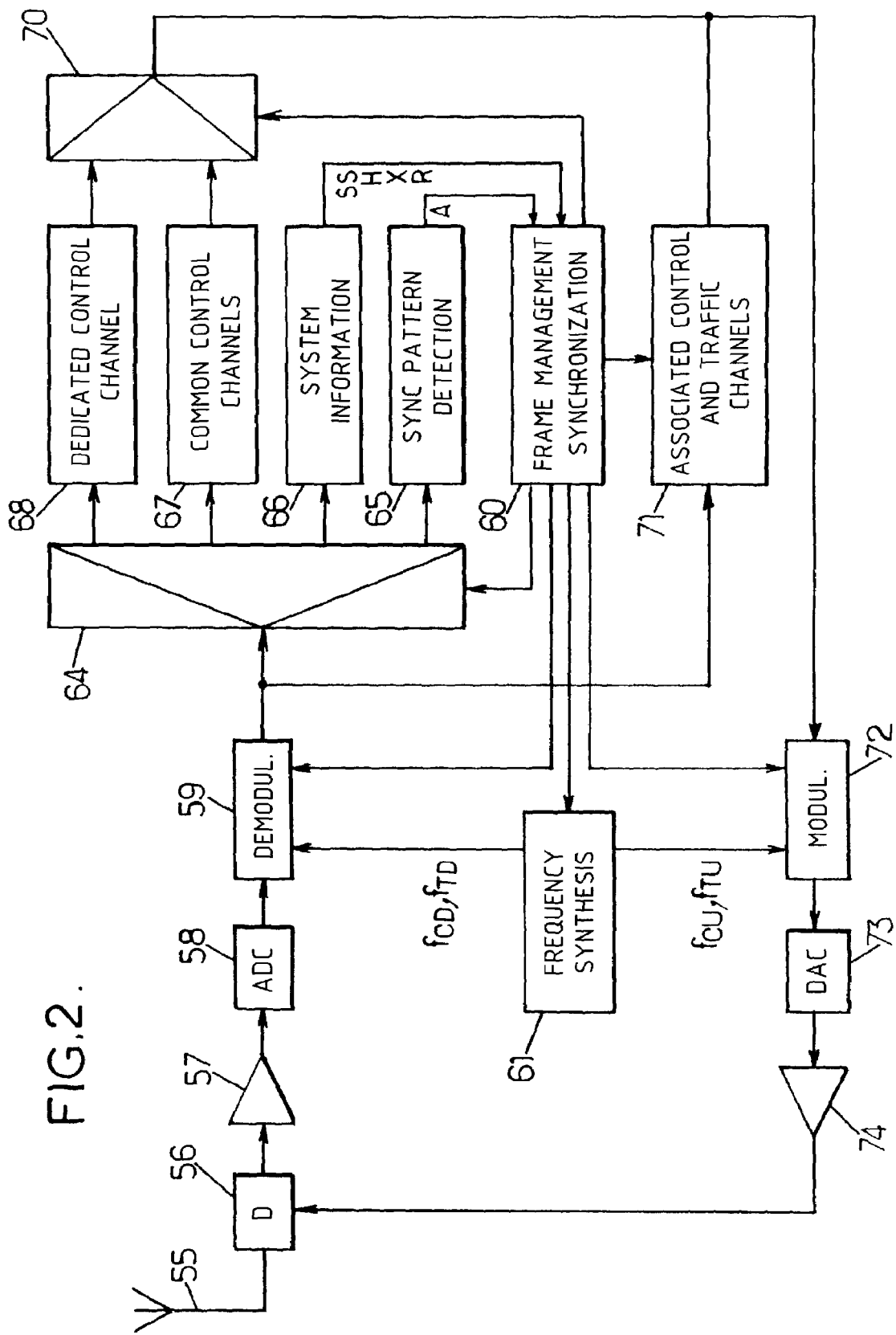
FIG. 2 is a block diagram of an example mobile terminal according to the invention.

In the embodiment described here by way of example, the base station and the mobile terminal which are represented in FIGS. 1 and 2 belong to a professional radio communications system operating in frequency-division multiple access (FDMA) mode. It is assumed, by way of illustration, that this system employs the channel-definition method described in the patent application EP-A-0 896 443, using, for the same service, either a complete channel with modulation coded by a code with efficiency 1/K (mode 2), or a subdivided channel with throughput K times smaller with non-coded modulation (mode 1), with K=2. Consideration is then taken of basic timeslots, having a duration $d_1$ of 20 ms, for example, used in mode 1, and composite timeslots, having a duration $d_2=K.d_1$ of 40 milliseconds, in this example, used in mode 2.

For each base station, on a particular frequency $f_{CD}$, a downlink physical channel is defined, devoted to the sending of control information. Symmetrically, an uplink physical channel is defined on a frequency $f_{CU}$ for transmission of control information from the mobile terminals to the base station. These physical control channels are subdivided into logical control channels by time-division multiplexing. Some of these logical channels are common channels, shared by the mobile terminals within range of the base station. Others are dedicated channels, which the base station uses to communicate with particular mobiles.

The signal transmitted on each of the physical control channels takes the form of successive frames subdivided into K.M basic timeslots belonging to different logical channels. In the example illustrated by FIG. 3, where M=13, the basic slots, denoted F, S0 and P belong to common downlink channels, and those denoted Si (with $1 \leq i \leq 11$) relate to dedicated two-way channels.

Figures 3, 8:
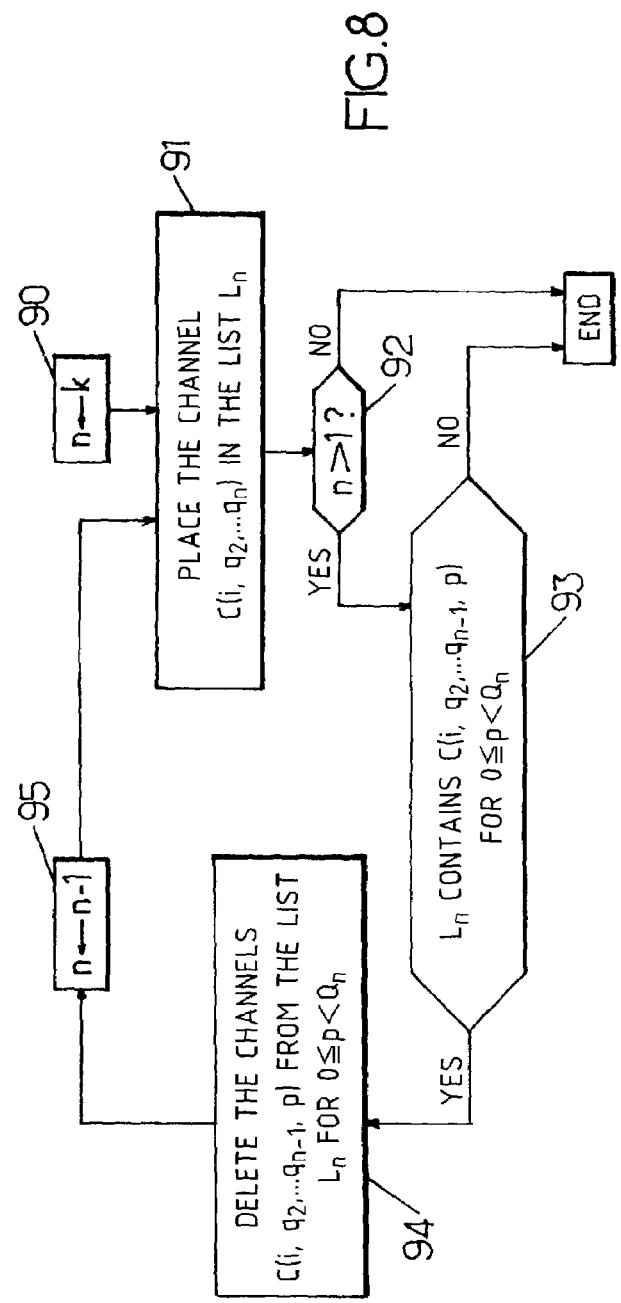
FIG. 3 is a diagram illustrating the structure of frames transmitted on physical control channels formed in one embodiment of the invention.
FIGS. 7 and 8 are flow charts of procedures for allocating and releasing dedicated channels with variable periodicity.

The slots F have a duration $d_1'$ and are repeated every K'.M basic timeslots, with $d_1'=d_1$ and K'=K=2 in the example of FIG. 3. They contain a synchronization pattern formed by a predetermined sequence of bits to enable frequency and time synchronization of the mobile terminals.

The slots S0 have a duration $d_1'$ and are repeated every K'.M basic timeslots. They contain system information necessary for coordination between the mobiles and the base station, comprising, for example: (i) a field H of 5 bits marking the position of the timeslot S0 in the current superframe (a superframe represents the smallest common multiple between the periodicity of the traffic channels and that of the control channels, i.e. 13×27 composite timeslots in the example considered, i.e. 14.04 s); (ii) a field X of 3 bits marking the position of the timeslot S0 in a longer period (hyperframe), such as an encryption period on the air interface (typically of the order of an hour); and (iii) a field R of 3 bits indicating the minimum field strength received for access to the cell (for example quantized in steps of 5 dB).

The slots P serve the base station for addressing messages to mobile terminals with which it is not communicating (paging). In the uplink, the basic timeslots left blank in FIG. 3, or those denoted Si ($1 \leq i \leq 11$) which are not allocated as dedicated channels, can be used by the mobile terminals to achieve random accesses (common uplink channel).

The slots Si ($1 \leq i \leq 11$) of the dedicated channels are used after an allocation procedure. They each occur twice per frame in the example considered. With the control frame being of 520 ms, a timeslot Si, for a given i, occurs on average every 260 ms, with a duration of 100 ms between the sending of a message by the base station on a downlink slot Si and the sending of the response by the mobile terminal on the next uplink slot Si, and a duration of 140 ms or 180 ms between the sending of a message by the mobile terminal on an uplink slot Si and the sending of the response by the base station on the next downlink slot Si.

The base station may further establish traffic channels with one or more mobile terminals situated within its range, after an establishment procedure carried out by means of a dedicated control channel Si. The traffic channel established with a terminal is downlink (frequency $f_{TD}$) and/or uplink (frequency $f_{TU}$). The traffic channel is multiplexed on a frequency $f_{TD}$ and/or $f_{TU}$ with associated signaling channels serving for exchanging signaling in the course of communication (for example measurements or commands for the control of the radio power transmitted by the mobiles, call signaling, requests and commands for changing cell, alternate pre-emption, etc).

Figure 4:
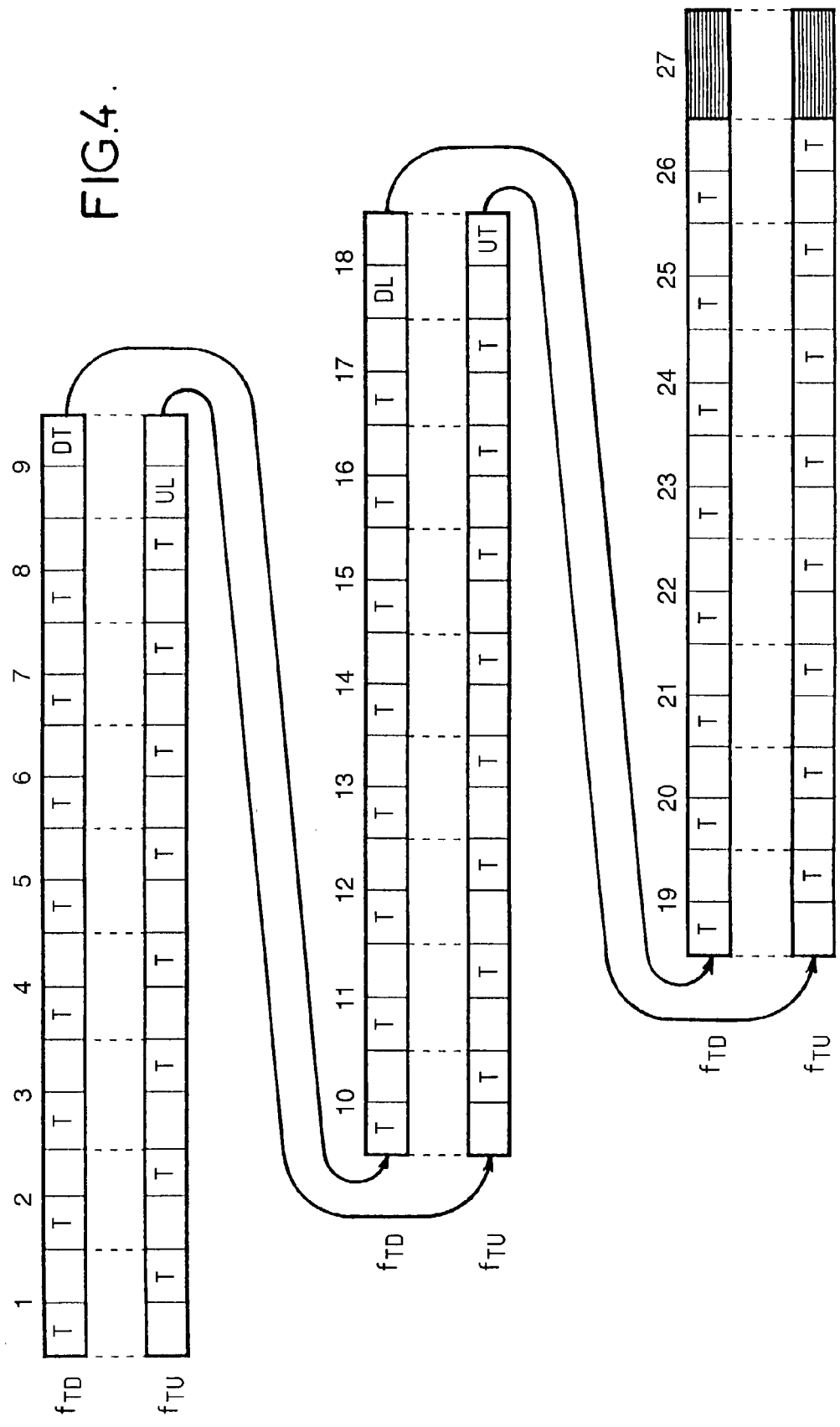
FIGS. 4 and 5 are diagrams respectively illustrating two structures of frames transmitted on traffic channels formed in one embodiment of the invention.
Figure 5:
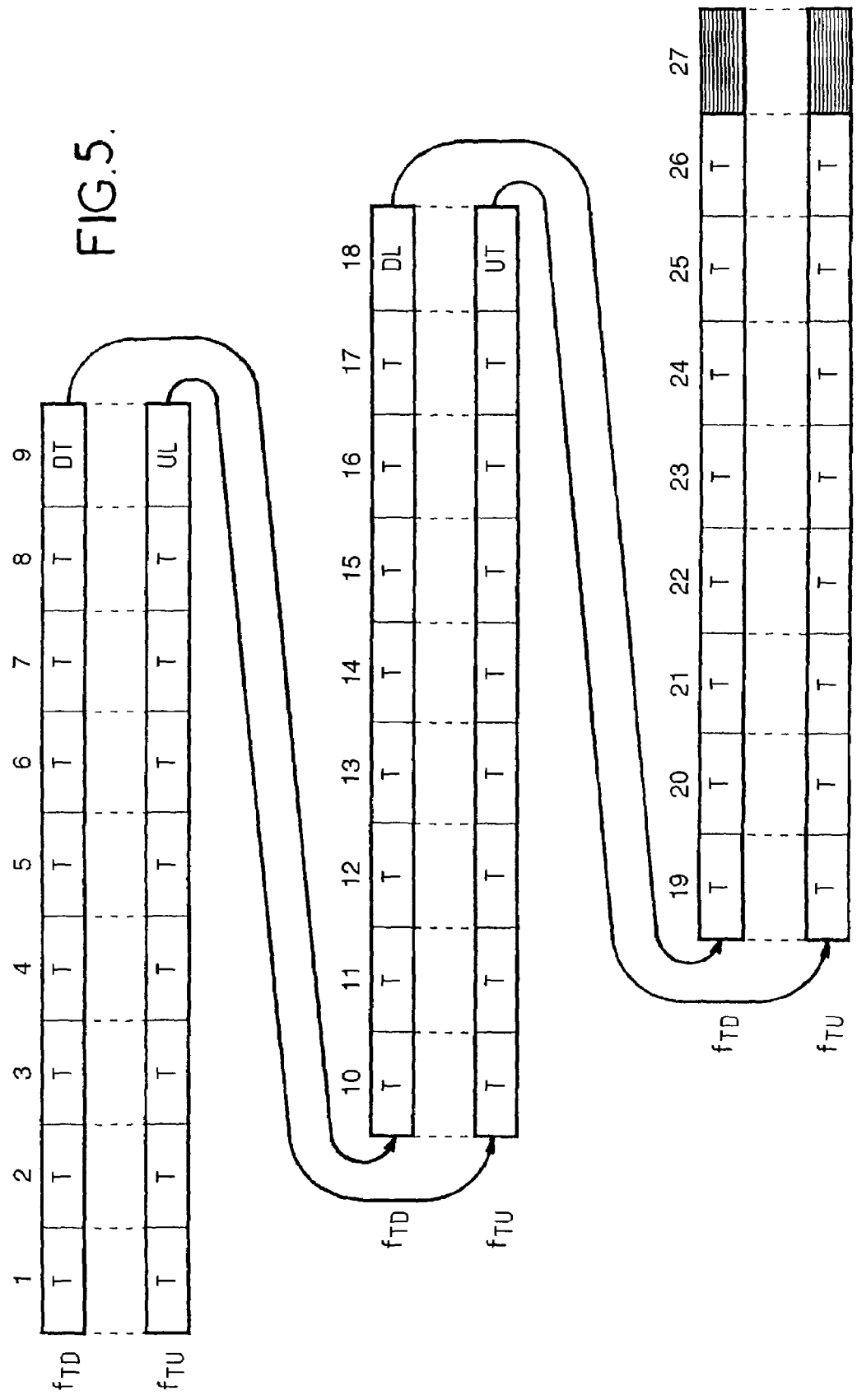

The uplink and downlink traffic channels may have the frame structure represented in FIG. 4, corresponding to mode 1, or that represented in FIG. 5 corresponding to mode 2. Each frame of the traffic channel has a duration corresponding to K.Q=54 basic timeslots (Q=27), and is divided into three parts of 18 basic slots. In each of these three parts, the first eight composite timeslots are occupied by the logical traffic channel. The ninth composite timeslot is occupied by associated control channels in the case of the first two parts, and unoccupied in the case of the third part. This unoccupied slot, shaded in FIGS. 4 and 5, constitutes a scanning window during which the mobile terminal changes frequency to observe the physical control channels of the base stations of the adjacent cells, to be able to perform a hand-off if necessary.

In mode 1 illustrated by FIG. 4, each of the first eight composite timeslots of each third of the frame includes an odd basic slot for the downlink and an even basic slot for the uplink, identified by the letter T on the Figure. In consequence, on the same downlink carrier $f_{TD}$, the base station can multiplex a logical traffic channel established with another mobile terminal. Moreover, if the mobile terminal is capable of changing from the frequency $f_{TD}$ to the frequency $f_{TU}$ and vice versa within the short time interval separating two basic slots, mode 1 makes it possible to establish the communication in time-duplex mode.

In mode 2 illustrated by FIG. 5, the composite timeslots of the frames transmitted on the traffic channels are not subdivided into two basic slots. The signal, transmitted with the same information throughput, is the subject of coded modulation with a coding rate of 1/K=1/2 as set out in patent application EP-A-0 896 443, which procures better sensitivity for the receiver. With this mode of operation, the time-duplex mode described above cannot be used. In the general case where the mobile terminals are not capable of modulating and demodulating simultaneously around two different carrier frequencies, this operating mode imposes alternate-type communications discipline.

In the scanning window of a traffic frame, the mobile terminal seeks to detect a synchronization pattern transmitted in the timeslot F of the control frame by the base station of a neighboring cell. It therefore demodulates the signal received at the frequency $f_{CD}$ used in this neighboring cell. If the synchronization pattern is detected, the terminal uses the same frequency $f_{CD}$ in the scanning window of a following frame, and seeks to extract the system information transmitted by the same base station in its slot S0. If this information is actually received, the mobile terminal is ready to change cell if necessary.

The scanning window has a duration $d_2$ corresponding to a composite timeslot, i.e. K=2 basic slots. To be sure that, in a superframe, these windows cover the timeslots F and S0 of the downlink control frames of the neighboring cells, it is advisable for the periodicity of these timing windows, and that of the timeslots F and S0 on the physical control channel, expressed in terms of numbers of composite timeslots, to be mutually prime. In other words, with the periodicity of the scanning windows being Q composite slots, and that of the timeslots F and S0 being M composite slots, the numbers M and Q are chosen to be mutually prime, which is the case in the embodiment described where M=13 and Q=27. The mobile terminal then scans the various possible frequencies $f_{CD}$ at the superframe rate, until it detects the synchronization pattern transmitted in a neighboring cell.

Furthermore, with the timeslot S0 occurring p composite slots after the timeslot F on the carrier $f_{CD}$, with p<M (p=1 in the example of FIG. 3), it is advisable to choose the integer Q in the form q.M+p, with q an integer. This condition is fulfilled in the example described, where p=1, q=2, M=13 and Q=27. So, when the mobile terminal picks up the synchronization pattern transmitted by a cell in a scanning window, it can pick up the system information transmitted by this same cell from the following scanning window, which minimizes the duration of the acquisition process.

In FIG. 1, the block 30 designates the source of the synchronization pattern transmitted in the slots F, and the block 31 the source of the system information transmitted in the slots S0. The block 32 diagrammatically represents the circuits serving for processing the information exchanged on the other common control channels, especially paging and random-access channels. The block 33 diagrammatically represents the circuits devoted to the processing and exchange of information on the dedicated control channels S1–S11 established with various mobile terminals in the cell. A multiplexer 35 receives the signals delivered by the blocks 30 to 33 and constructs the uplink frames represented in the upper part of FIG. 3 under the control of a frame-management and synchronization module 36. The output stream from the multiplexer 35 is supplied to a modulator 37 which carries out the modulation about the carrier frequency $f_{CD}$ supplied by the frequency-synthesis module 38.

For reception on the control channel, the base station includes a demodulator 49 which demodulates the signal received relating to the carrier frequency $f_{CU}$ supplied by the module 38, and delivers, to the demultiplexer 51, the downlink binary frames having the structure represented in the lower part of FIG. 3. Under the control of the frame-management and synchronization module 36, the demultiplexer 51 extracts the information which is relevant to the common control channels 32 and the dedicated control channels 33.

In addition to the physical control channel, the base station can establish a certain number of traffic channels with mobile terminals situated within its range. In the simplified example represented in FIG. 1, it is considered that the base station is using a single downlink traffic frequency $f_{TD}$ and a single uplink traffic frequency $f_{TU}$, the block 40 designating the circuits, supervised by the module 36, serving for the processing and exchanges on these traffic channels and on the associated control channels.

A modulator 41 modulates the digital signal produced by the block 40, which has the structure represented in the upper part of FIG. 4 or 5, around the carrier frequency $f_{TD}$ delivered by the frequency-synthesis module 38. A demodulator 50 receives, from the synthesis module 38, the frequency $f_{TU}$ of the uplink traffic channel. The resultant digital signal, which has the structure represented in the lower part of FIG. 4 or 5, is forwarded to the processing circuits 40 of the traffic channel.

When a traffic channel has been allocated, the frame-management and synchronization module 36 controls the modulator 41 and the demodulator 50 to activate the coding for the modulation and to apply the corresponding demodulation scheme only if mode 2 is required (FIG. 5).

In practice, to provide for multiple access, the base station includes several modulators 41 and several demodulators 50 operating according to the various traffic frequencies.

The radio signals delivered by the modulators 37 and 41 are combined by the summer 42. The resulting signal is converted into analog at 43, then amplified at 44 before being transmitted by the antenna 45 of the base station. A duplexer 46 extracts the radio signal picked up by the antenna 45 of the base station, and supplies it to an amplifier 47. After digitizing 48, the received and amplified signal is supplied to the demodulators 49 and 50.

A mobile terminal communicating with the above base station may be in accordance with the block diagram of FIG. 2. The antenna 35 is linked to a duplexer 56 in order to separate the transmitted and received signals. The received signal is amplified at 57, then digitized at 58 before being forwarded to the demodulator 59. The mobile terminal comprises a frame-management and synchronization module 60, which drives the frequency-synthesis module 61 so that it supplies the demodulator 59 either with the frequency $f_{CD}$ of a physical control channel, or the frequency $f_{TD}$ of a downlink traffic channel allocated to the terminal.

When the demodulator 59 is operating at the frequency $f_{CD}$, the digital-signal frames, which may have the structure represented in the upper part of FIG. 3, are forwarded to a demultiplexer 64 driven by the synchronization module 60 in order to distribute the signals arising from the various logical channels to the blocks 65, 66, 67, 68 which designate the circuits respectively used to detect the synchronization patterns on the logical channel F, to extract the system information from the logical channel S0, to process the common control channels and to process the dedicated control channel Si possibly allocated to the terminal. The frame-management and synchronization module 60 also drives a multiplexer 70 which forms the contribution of the terminal to the up frames at the frequency $f_{CU}$ (lower part of FIG. 3).

When a traffic channel is allocated, the demodulator 59 operates at the frequency $f_{TD}$ (except in the scanning windows), and its output signal is forwarded to the circuits 71 which process the traffic channel and the associated control channels (reception of channels DT, DL of FIGS. 4 and 5). These circuits 71 moreover deliver the stream to be transmitted on the frequency $f_{TU}$, represented in FIG. 4 or 5 (traffic channel and associated channels UL, UT).

The modulator 72 of the mobile terminal, controlled by the module 60, receives either the stream delivered by the multiplexer 70 and the frequency $f_{CU}$ for transmission on the physical control channel, or else the stream delivered by the circuits 71 and the frequency $f_{TU}$ for transmission on the traffic channel. The output radio signal from the modulator 72 is converted into analog at 73, and amplified at 74 before being transmitted via the antenna 55.

When a traffic channel has been allocated, the frame-management and synchronization module 60 orders the modulator 72 and the demodulator 59 to activate the coding for the modulation and to apply the corresponding demodulation scheme only if mode 2 is required (FIG. 5).

In the scanning windows, the frame-management and synchronization module 60 of the terminal indicates to the frequency-synthesis module 61 the frequency $f_{CD}$ to be supplied to the demodulator 59, separate from the frequency $f_{CD}$ of the serving base station. It further drives the demultiplexer 64 S0 that the demodulated signal is forwarded to the block 65 for detecting the synchronization pattern. If the synchronization pattern is not detected, the module 60 repeats the same process in the next scanning window, until the same frequency $f_{CD}$ has been scanned M times. When the synchronization pattern is detected in a scanning window (data A in FIG. 2), the module 60 causes the same frequency $f_{CD}$ to be maintained in the next window, and it drives the demultiplexer 64 to forward the demodulated signal to the system-information extraction block 66.

Figure 6:
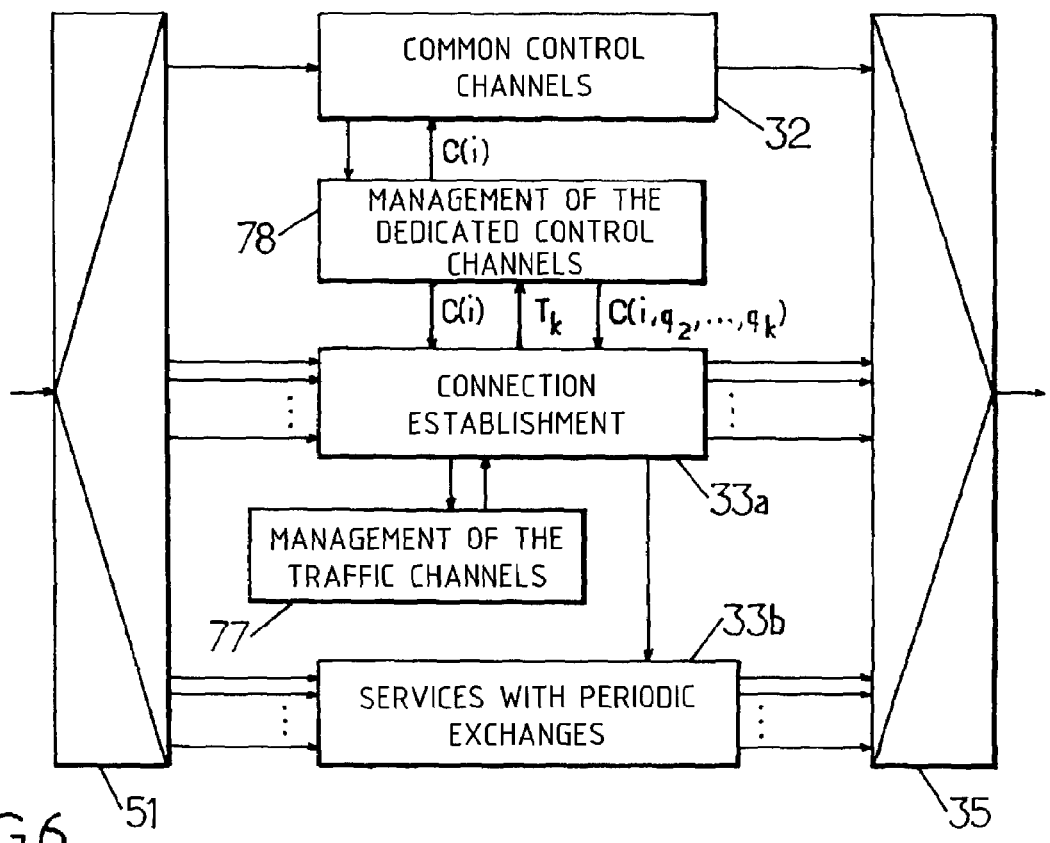
FIG. 6 is a more detailed block diagram of the part of a base station according to FIG. 1 processing dedicated control channels.

In the representation of FIG. 6, the block 33 of FIG. 1 has been split into two parts 33a and 33b. In what follows, "reference channel" will be understood to mean a channel formed, for a given index i, by all the timeslots Si on a control carrier $f_{CD}$ and/or $f_{CU}$. It was seen that the average periodicity of these Si timeslots is $T_1=260$ ms in each direction.

The reference 33a designates a module devoted to the processing and exchange of information on those of the dedicated control channels S1–S11 which constitute signaling channels used for establishing dedicated resources (connections) in response to the signaling exchanged on the common control channels. Such a signaling channel, used in a transient phase of connection establishment, typically consists of a reference channel. The module 33a carries out the operations required by the call setup protocols used in the network.

The reference 33b designates a module devoted to the processing and exchange of information on dedicated control channels which are used to support services involving periodic exchanges between the infrastructure and mobile terminals. Such a service uses the whole or only a fraction of a reference channel, depending on the periodicity of the exchanges which it requires between the infrastructure and the mobile terminal or terminals concerned.

The various possible periodicities for the services thus supported will be denoted $T_k$ ($1 \leq k \leq N$), with $T_N > T_{N-1} > \ldots > T_2 > T_1 = 260$ ms. These periodicities will preferably be chosen in such a way that, for $1 < k \leq N$, $T_k = Q_k \cdot T_{k-1} = P_k \cdot T_1$ with $Q_k$ an integer and $$P_k = \prod_{n=2}^{k} Q_n.$$

To achieve the periodicity $T_k$ ($k \geq 1$) within a reference channel Si, a timeslot Si will be used every $P_k$ (with $P_1=1$). An entire logical channel, or level-1 channel, corresponding to the reference channel Si, will be designated by C(i), and a subdivided logical channel of level k>1, consisting of one Si timeslot every $P_k$, will be designated by C(i, $q_2, \ldots, q_k$), where i indexes the reference channel Si and the integers $q_n$ ($1 < n \leq k$) are such that $0 \leq q_n < Q_n$ and that the number $$\sum_{n=2}^{k} q_n \cdot P_{n-1}$$

designates the position, modulo $P_k$, of the Si timeslots allocated to the channel in a multiframe of duration $T_N$ which may correspond to one or more superframes. Each channel C(i, $q_2, \ldots, q_k$) of level k<N may, in turn, be divided into $Q_{k+1}$ subdivided channels of level k+1, namely C(i, $q_2, \ldots, q_k, q_{k+1}$) for $0 \leq q_{k+1} < Q_{k+1}$. Each periodicity $T_k$ ($1 \leq k \leq N$) is thus an integer multiple or a divider of the period of the superframes, which allows the stations in communication to identify the subdivided channels with respect to the synchronization of the system.

TABLE I

| k | Periodicity $T_k$ | $Q_k$ | $P_k$ |
|---|---|---|---|
| 1 | 260 ms | / | 1 |
| 2 | 780 ms | 3 | 3 |
| 3 | 2.34 s | 3 | 9 |
| 4 | 7.02 s | 3 | 27 |
| 5 | 14.04 s | 2 | 54 |
| 6 | 28.08 s | 2 | 108 |

By way of example, the network may support a service for locating certain mobile terminals, with a periodicity which can be adjusted by the user. The mobile terminal may be associated with a GPS-type location receiver or the like, which supplies an estimate of its geographical position on the basis of signals picked up from a set of satellites. By periodically sending these estimates to the infrastructure, it is possible to carry out monitoring of the carrier of the mobile terminal. Depending on the user's needs, the transmitted information may be updated with a greater or lesser periodicity, for example as indicated in Table I, where the multiframe corresponds to two superframes of 14.04 s.

When a relatively lengthy period $T_k$ has been chosen, a mobile terminal in communication is disturbed little by the location service. The break in the speech transmission due to the sending of the position-fixing message in one Si timeslot on the frequency $f_{CU}$ is 40 ms at each period $T_k$, which is imperceptible if $T_k$ is of the order of one or a few tens of seconds, especially if account is taken of the interpolation capabilities of the majority of modern vocoders. It may be possible, in the call setup protocol, to make provision for the periodicity $T_k$ of the location service to be increased while a voice communication is in progress.

FIG. 6 shows two more modules 77, 78 which manage the allocation of the dedicated resources. The module 77, in a conventional way, manages the allocation of the traffic frequencies $f_{TD}$, $f_{TU}$, on the basis of the availabilities in step with the requests for and releases of channels.

The module 78, for its part, manages the allocation of the timeslots Si on the control frequencies $f_{CD}$, $f_{CU}$ (entire and subdivided channels). When a connection-establishment request is received or sent to a mobile terminal by the module 32, a dedicated level-1 channel is first requested for carrying on the signaling dialogue. The management module 78 allocates this channel C(i) and indicates it to the module 33a for it to use it, and to the module 32 for it to notify it to the mobile terminal. If the request relates to a traffic channel, it is dealt with by the module 77. Otherwise, it is forwarded to the module 78 with the desired periodicity $T_k$ which has been specified, by the infrastructure or by the mobile terminal, in the context of the call setup protocol. After the allocation of a logical channel $C(i, q_2, \ldots, q_k)$ of level k by the module 78, the establishing of the connection terminates with the sending of an identifier of this channel to the mobile terminal as well as to the module 33b so that it can be used for the transmissions required by the service in question.

Figure 7:
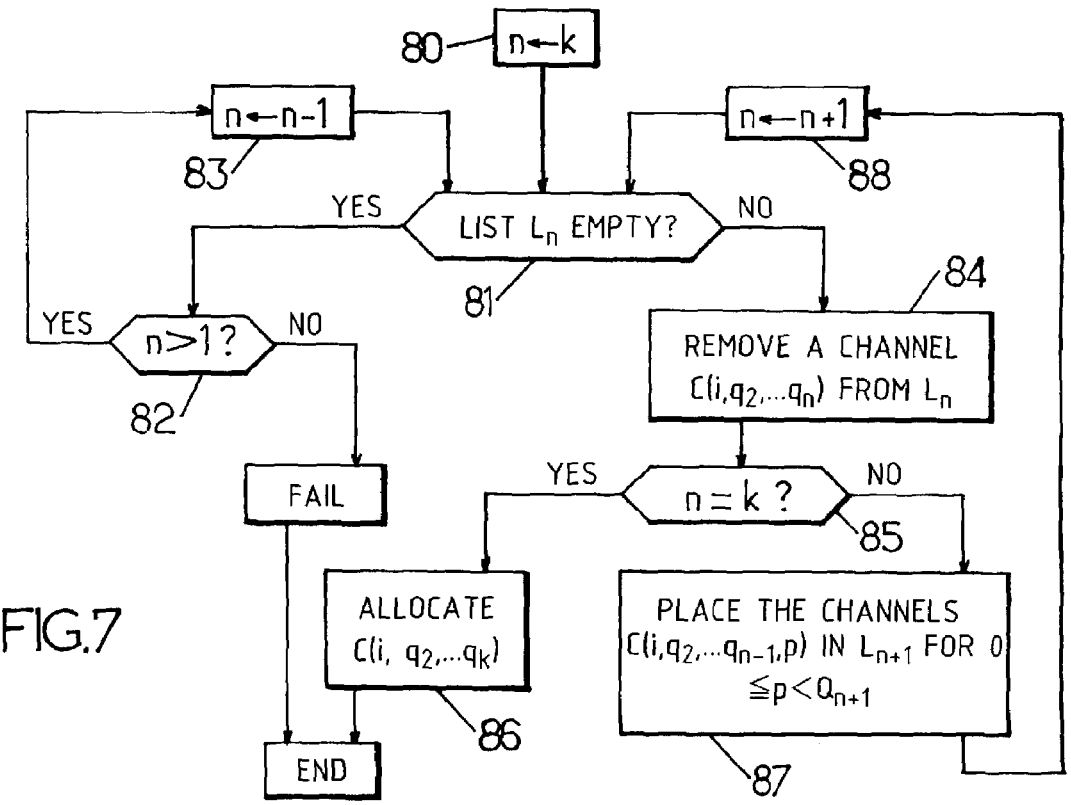

FIG. 7 shows a flow chart of a procedure for allocating dedicated variable-periodicity channels which the module 78 can apply in response to a request for a channel of level $k \geq 1$.

This procedure, for each level $n \leq N$, uses a list $L_n$ of free channels of level n, designated by the indices i, $q_1, \ldots, q_n$. Initially, the list $L_1$ contains all the indices i of the timeslots Si, and each list $L_n$ with n>1 is empty. In response to the request for a channel of level $k \geq 1$, the values of the iteration index n are run through in the decreasing direction from n=k (initialization 80) until a free channel of level n is found, after which the lists $L_n$ to $L_k$ are updated. At each iteration n, it is checked whether the list $L_n$ is empty (test 81). If $L_n$ is empty and if n=1 (test 82), the allocation procedure fails because of the unavailability of the requested resource. If $L_n$ is empty and if n>1, the index n is decremented at stage 83 before coming back to test 81 for the following iteration. When the test 81 shows that the list $L_n$ contains one or more free logical channels of level n, one of these channels $C(i, q_2, \ldots, q_n)$ is selected and withdrawn from the list $L_n$ at stage 84, then the iteration index n is compared with the level k of the channel requested (test 85). If n=k, the procedure terminates with the allocation of the logical channel $C(i, q_2, \ldots, q_k)$ at stage 86. If n<k, all the sister channels of level n+1 which it is possible to obtain by subdivision of the channel $C(i, q_2, \ldots, q_n)$ (namely $C(i, q_2, \ldots, q_n, p)$ for $0 \leq P \leq Q_{n+1}$) are placed in the list $L_{n+1}$ at stage 87, then the index n is incremented at stage 88 before coming back to test 81 for the following iteration.

FIG. 6 shows a flow chart of a procedure for releasing a previously allocated channel $C(i, q_2, \ldots, q_k)$ of level $k \geq 1$. This procedure may supplement the allocation procedure of FIG. 7.

In response to the request for releasing the channel $C(i, q_2, \ldots, q_k)$, the values of the iteration index n are run through in the decreasing direction from n=k (initialization 90) until n=1 so as to update the lists $L_k$ to $L_1$ if necessary. At each iteration n, the logical channel $C(i, q_2, \ldots, q_n)$ is placed back in the list $L_n$ at stage 91, then index n is compared with 1 (test 92). If n>1, it is checked, at test 93, whether the list $L_n$ contains all the sister logical channels of the channel which has just been placed back in this list $L_n$, namely all the channels $C(i, q_2, \ldots, q_{n-1}, p)$ for $0 \leq p \leq Q_n$. If yes, all the channels $C(i, q_2, q_{n-1}, p)$ are deleted from the list $L_n$ at stage 94, then the index n is decremented at stage 95 before coming back to stage 91 for the following iteration. The releasing procedure is terminated when test 92 shows n=1 or when test 92 shows that an updated list $L_n$ does not contain all the sister channels of the one which has just been reincorporated into this list.

Depending on the order in which the previously allocated subdivided channels are released, situations may arise in which the occupation of a few channels of relatively high level (with lengthy periodicity) which are badly distributed renders unavailable an excessive number of channels of a lower level. In order to avoid that, provision can be made for only some of the slots Si to supply subdivided channels and to be subjected to the allocation and releasing algorithm of FIGS. 7 and 8. If necessary, it is possible, moreover, to envisage having recourse to channel transfers (handovers) on the control carrier to reorganize the lists $L_n$ by grouping together the channels of relatively high level in the same branches of the occupation tree so as to release channels of lower levels.

The same method can be used to implement a connected-mode messaging service (paging) intended for simplified terminals or pagers. These pagers may be specific terminals, the principal characteristics of which are small size, low consumption related to a frequent standby state which limits the average consumption by virtue of the turning-off of the majority of the circuits with the exception of a low-frequency clock which monitors the periodic waking and the presence of an antenna integrated into the casing of the terminal the efficiency of which is generally mediocre, with a gain generally less than 7 to 8 dB by comparison with the gain of the antennas of mobile terminals. In order to offer a coverage similar to that of the other mobile terminals, the radio communications system uses a specific channel coding for the transmission of data intended for pagers. This high-gain coding, thus offering a reduced data throughput, is different from that used for the other mobile terminals. Moreover, having regard to the low throughput levels which are necessary in this type of application, in which the message is generally a message for warning personnel in a standby situation, of a near-binary nature, a low periodicity of the timeslots reserved for this service will be chosen. By way of example, each of the slots contains 40 information bits obtained from 280 bits, by virtue of a coding with efficiency $\frac{1}{7}$ which supplies the coding gain necessary to compensate for the reduced gain of the antenna of the pagers.

One of the dedicated subdivided channels $C(ip, qp_2, \ldots, qp_k)$ can be reserved for this messaging service. It would be possible, depending on the desired alert times, to choose a periodicity $T_k$ ranging from 2.34 to 28.08 seconds, for example ($T_3$ to $T_6$ of Table I). With the above-described way of allocating the dedicated channels, it is sufficient to exclude the subdivided channel in question from the allocation procedure of FIG. 7 for the normal mobile terminals not to seek to decode the corresponding timeslots. To do that, the channels $C(ip, qp_2, \ldots, qp_n)$ are removed from the lists $L_n$ for $1 \leq n \leq k$. Under these conditions, the operation of the normal mobile terminals is not disturbed by the presence of a different channel coding on the subdivided channel $C(ip, qp_2, \ldots, qp_k)$.

It is sufficient that, from time to time, a particular sequence of bits be transmitted on a timeslot reserved for the paging service for the messaging terminals to recognize the presence of this channel and to be synchronized for the subsequent reception of the information.

The applications of the subdivided dedicated channels described above are not limiting. It is also possible to use the method according to the invention to implement professional radio communications systems in which certain terminals are used for remote-control or telemetry functions with variable information-transmission or control periodicities, from one terminal to another or for the same terminal, depending on circumstances.

The invention claimed is:

1. A method of radio communications between a base station and mobile terminals, wherein at least one carrier frequency is apportioned to timeslots, and logical channels are formed between the base station and mobile terminals to support services in connection with said mobile terminals, each of said logical channels consisting of recurring timeslots allocated to at least one mobile terminal on said carrier frequency, the method comprising the following steps to implement one of said services which involves transmission of periodically updated information:

selecting a recurrence frequency from a plurality of possible values, as being substantially the inverse of the updating period for said information;

forming a logical channel between the base station and a mobile terminal by allocating timeslots having the selected recurrence frequency on the carrier frequency, wherein the recurrence frequency of the timeslots is selected from a set of values of the form $1/T_k$ where k is a positive integer and $T_{k+1}/T_k$ is an integer for any k, $T_1$ being a basic timeslot periodicity on the carrier frequency and wherein each periodicity $T_k$ with $k \geq 1$ is an integer multiple or a divider of a superframe period equal to the smallest common multiple of a first frame period defined for the time-division sharing of said carrier frequency and of a second frame period defined for the time-division sharing of another carrier frequency supporting traffic channels; and transmitting said periodically undated information in said logical channel.

2. The method as claimed in claim 1, further comprising the steps of:

defining reference channels on the carrier frequency, having timeslots of periodicity $T_1$; and as timeslots having recurrence frequencies of the form $1/T_k$ with k>1 are allocated, subdividing at least some of said reference channels to form the corresponding logical channels.

3. The method as claimed in claim 1, wherein one of said services is a mobile terminal location service, in which a mobile terminal automatically transmits information on its geographical location, with an adjustable periodicity.

4. The method as claimed in claim 1, wherein one of said services is a messaging service for periodically delivering messages to a particular category of mobile terminals.

5. The method as claimed in claim 1, wherein said other carrier frequency supports voice channels.

6. A radio communications base station, comprising means for multiplexing logical channels on at least one carrier frequency to support services in connection with mobile terminals, each of said logical channels consisting of recurring timeslot allocated to at least one mobile terminal on said carrier frequency; and channel-establishing means arranged to establish at least one of said logical channels supporting a service which involves transmission of periodically updated information, by allocating timeslots on the carrier frequency, having a recurrence frequency selected, from a plurality of possible values, as being substantially the inverse of the updating period for said information, wherein the channel-establishing means are arranged to allocate timeslots having a recurrence frequency selected from a set of values of the form $1/T_k$ where k is a positive integer and $T_{k+1}/T_k$ is an integer for any k, $T_1$ being a basic timeslot periodicity on the carrier frequency and wherein each periodicity $T_k$ with $k \geq 1$ is an integer multiple or a divider of a superframe period equal to the smallest common multiple of a first frame period defined for the time-division sharing of said carrier frequency and of a second frame period defined for the time-division sharing of another carrier frequency supporting traffic channels.

7. The base station as claimed in claim 6, wherein reference channels, having timeslots of periodicity $T_1$, are defined on the carrier frequency, and wherein the channel-establishing means subdivide at least some of said reference channels to form logical channels as timeslots having recurrence frequencies of the form $1/T_k$ with k>1 are allocated.

8. The base station as claimed in claim 6, wherein one of said services is a mobile-terminal location service, in which a mobile terminal automatically transmits information on its geographical location, with an adjustable periodicity.

9. The base station as claimed in claim 6, wherein one of said services is a messaging service for periodically delivering messages to a particular category of mobile terminals.

10. The base station as claimed in claim 6, wherein said other carrier frequency supports voice channels.

11. A mobile radio communications terminal, comprising means for communicating on at least one carrier frequency apportioned to timeslots, along at least one logical channel formed with a base station of a radio infrastructure to support a service in connection with the mobile terminal, said logical channel consisting of recurring timeslots allocated to the mobile terminal on said carrier frequency; and means for communicating along said logical channel, supporting a service which involves transmission of periodically updated information, in timeslots on the carrier frequency having a recurrence frequency selected, from a plurality of possible values, as being substantially the inverse of the updating period for said information, wherein the recurrence frequency of the timeslots forming said logical channel belongs to a set of values of the form $1/T_k$ where k is a positive integer and $T_{k+1}/T_k$ is an integer for any k, $T_1$ being a basic timeslot periodicity on the carrier frequency and wherein each periodicity $T_k$ with $k \geq 1$ is an integer multiple or a divider of a superframe period equal to the smallest common multiple of a first frame period defined for the time-division sharing of said carrier frequency and of a second frame period defined for the time-division sharing of another carrier frequency supporting traffic channels.

12. The mobile terminal as claimed in claim 11, wherein reference channels, having timeslots of periodicity $T_1$, are defined on the carrier frequency, and wherein, as timeslots having recurrence frequencies of the form $1/T_k$ with k>1 are allocated, at least some of said reference channels are subdivided to form the corresponding logical channels.

13. Previously presented) The mobile terminal as claimed in claim 11, wherein one of said services is a location service, in which the mobile terminal automatically transmits information on its geographical location, with an adjustable periodicity.

14. The mobile terminal as claimed in claim 11, forming a messaging receiver periodically receiving messages from the radio infrastructure along said logical channel.

15. The mobile terminal as claimed in claim 11, wherein said other carrier supports voice channels.

\* \* \* \* \*